United States Patent
Davis

(10) Patent No.: US 6,409,629 B1
(45) Date of Patent: Jun. 25, 2002

(54) AUTOMATED TRANSMISSION UPSHIFT CONTROL WITH UPSHIFT BRAKE THERMAL PROTECTION

(75) Inventor: Alan R. Davis, Plainwell, MI (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 09/573,873

(22) Filed: May 17, 2000

(51) Int. Cl.⁷ .......................... F16H 59/14; F16H 59/30
(52) U.S. Cl. ........................................ 477/98; 477/124
(58) Field of Search .......................... 74/336 R; 477/79, 477/98, 124

(56) References Cited

U.S. PATENT DOCUMENTS

| | | | |
|---|---|---|---|
| 4,361,060 A | 11/1982 | Smyth | 74/866 |
| 4,507,736 A | 3/1985 | Klatt | 477/123 |
| 4,576,065 A | 3/1986 | Speranza et al. | 477/124 |
| 4,576,263 A | 3/1986 | Lane et al. | 192/44 |
| 4,595,986 A | 6/1986 | Daubenspeck et al. | 364/424.1 |
| 4,648,290 A | 3/1987 | Dunkley et al. | 477/78 |
| 4,850,236 A | 7/1989 | Braun | 74/337 |
| 4,913,269 A | 4/1990 | Dunkley et al. | 192/3.63 |
| 4,947,331 A | 8/1990 | Speranza | 364/424.1 |
| 5,172,609 A | 12/1992 | Nitz et al. | 74/866 |
| 5,219,391 A | 6/1993 | Edelen et al. | 74/335 |
| 5,272,939 A | 12/1993 | Markyvech | 74/866 |
| 5,335,566 A | 8/1994 | Genise | 74/335 |
| 5,389,053 A | 2/1995 | Steeby et al. | 477/123 |
| 5,390,561 A | 2/1995 | Stine | 74/331 |
| 5,409,432 A | 4/1995 | Steeby | 477/71 |
| 5,425,689 A | 6/1995 | Genise | 477/120 |
| 5,435,212 A | 7/1995 | Menig | 74/745 |
| 5,479,345 A | 12/1995 | Amsallen | 364/424.1 |
| 5,487,004 A | 1/1996 | Amsallen | 364/424.1 |
| 5,489,247 A | 2/1996 | Markyvech | 447/120 |
| 5,490,063 A | 2/1996 | Genise | 364/424.1 |
| 5,509,867 A | 4/1996 | Genise | 477/120 |
| 5,533,946 A | 7/1996 | Markyvech | 477/78 |
| 5,582,069 A | 12/1996 | Genise | 74/335 |
| 5,620,392 A | 4/1997 | Genise | 477/120 |
| 5,655,407 A | 8/1997 | Dresden et al. | 74/336 |
| 5,679,093 A | 10/1997 | Desautels | 477/124 |
| 5,713,445 A | 2/1998 | Davis et al. | 192/35 |
| 5,737,978 A | 4/1998 | Stine | 74/606 |
| 5,743,143 A | 4/1998 | Carpenter et al. | 74/335 |
| 5,766,111 A | 6/1998 | Steeby et al. | 477/124 |
| 5,868,033 A | * 2/1999 | Nishino et al. | 74/335 R |
| 5,944,630 A | 8/1999 | Omote | 74/335 |
| 6,017,291 A | * 1/2000 | Ailes et al. | 477/124 |
| 6,123,643 A | * 9/2000 | Davis et al. | 477/98 X |
| 6,049,545 A | * 11/2000 | Genise et al. | 477/124 |
| 6,146,309 A | * 11/2000 | Nishino et al. | 477/98 |

FOREIGN PATENT DOCUMENTS

| | | | | |
|---|---|---|---|---|
| JP | 404046224 | * | 2/1992 | 477/98 |
| JP | 404066337 | * | 3/1992 | 477/98 |
| JP | 404254063 | * | 9/1992 | 447/98 |

* cited by examiner

Primary Examiner—Charles A Marmor
Assistant Examiner—Roger Pang
(74) Attorney, Agent, or Firm—Howard D. Gordon

(57) ABSTRACT

A method/system for controlling upshifting in an automated mechanical transmission system (10) utilized on a vehicle preferably having an ECU (28) operated friction upshift brake (26). To prevent thermal damage to the upshift brake, a predicted brake temperature ($TEMP_p$) at completion of an aided upshift is determined and compared to an allowable maximum ($TEMP_{MAX}$). If predicted brake temperature exceeds the maximum ($TEMP_p > TEMP_{MAX}$) using the upshift brake for the upshift is prohibited.

20 Claims, 4 Drawing Sheets

AUTOMATED TRANSMISSION UPSHIFT CONTROL WITH UPSHIFT BRAKE THERMAL PROTECTION

RELATED APPLICATIONS

This application is related to U.S. Ser. No. 09/232,252 titled AUTOMATED TRANSMISSION UPSHIFT CONTROL filed Jan. 14, 1999, now U.S. Pat. No. 6,149,545 and U.S. Ser. No. 09/563,097 titled AUTOMATED TRANSMISSION UPSHIFT CONTROL filed May 2, 2000, both assigned to EATON CORPORATION, assignee of this application.

BACKGROUND OF THE INVENTION

1. Field of the Invention

The present invention relates to a control method/system for controlling upshifting in an at least partially automated mechanical transmission system. In particular, the present invention relates to the control of upshifting in a vehicular automated mechanical transmission system wherein the system senses conditions indicative of a requirement for an upshift from a currently engaged gear ratio (GR) and evaluates, in sequence, the desirability of unaided skip and/or single upshifts and then upshift brake-assisted skip and/or single upshifts and commands upshifts deemed desirable.

More particularly, the present invention relates to a control method/system for evaluating feasibility of upshift brake-aided upshifts as a function of the thermal characteristics of the upshift brake, the estimated current temperature of the brake, the period of time since the previous upshift brake-aided upshift and/or the expected heat energy generated by the previous upshift brake-aided upshift and/or the upshift under consideration.

2. Description of the Prior Art

Fully or partially automated mechanical transmission systems for vehicular use are known in the prior art, as may be seen by reference to U.S. Pat. Nos. 4,361,060; 4,648,290; 4,722,248; 4,850,236; 5,389,053; 5,487,004; 5,435,212 and 5,755,639, the disclosures of which are incorporated herein by reference. The use of engine brakes (also known as compression brakes, exhaust brakes or Jake brakes) and transmission controls utilizing same are known in the prior art, as may be seen by reference to U.S. Pat. Nos. 5,409,432 and 5,425,689, the disclosures of which are incorporated herein by reference.

The use of friction devices to retard transmission input shaft rotation, such as inertia brakes (also known as upshift brakes or input shaft brakes) and actuators therefor, for providing quicker upshifts is known in the prior art, as may be seen by reference to U.S. Pat. Nos. 5,086,659 and 5,713,445, the disclosures of which are incorporated herein by reference.

Controls for automated mechanical transmission systems, especially wherein shifting is accomplished while maintaining the master clutch engaged, wherein single and/or skip shift feasibility is evaluated are known in the prior art, as may be seen by reference to U.S. Pat. Nos. 4,576,065; 4,916,979; 5,335,566; 5,425,689; 5,272,939; 5,479,345; 5,533,946; 5,582,069; 5,620,392; 5,489,247; 5,490,063 and 5,509,867, the disclosures of which are incorporated herein by reference.

SUMMARY OF THE INVENTION

In the system described in copending U.S. Ser. No. 09/232,252 and in copending U.S. Ser. No. 09/563,097 (a continuation-in-part of Ser. No. 09/232,252), a control for a vehicular automated mechanical transmission system will sense conditions indicative of upshifting from a currently engaged gear ratio, will evaluate, in sequence, the desirability of large skip upshifts, then single skip upshifts, unaided single upshifts and then upshift brake-aided single upshifts, and will command an upshift to the first target ratio deemed to be feasible under current vehicle operating conditions.

The upshift feasibility rules comprise a two-part test, (a) can the upshift be completed above a minimum engine speed? and (b) when completed, will the engine, in the target ratio, provide sufficient torque at the drive wheels to allow at least a minimum vehicle acceleration? Feasibility of skip and/or single upshifts also may require that an upshift is expected to be completed within a period of time less than a maximum acceptable time ($T<T_{MAX}$?).

To prevent undue wear and/or damage of friction-type upshift brakes, the predicted temperature of the brake at completion of the proposed upshift is estimated or simulated and, if greater than a reference value, the proposed upshift brake-aided upshift is deemed not feasible ($TEMP_P<TEMP_{MAX}$?).

Accordingly, an improved upshift control for automated mechanical transmissions is provided which will automatically evaluate and command feasible unaided and then upshift brake-aided upshifts and which provides thermal protection for the friction-type upshift brake.

This and other objects and advantages of the present invention will become apparent from a reading of the following description of the preferred embodiment taken in connection with the attached drawings.

DESCRIPTION OF THE PREFERRED EMBODIMENT

Figure 1:
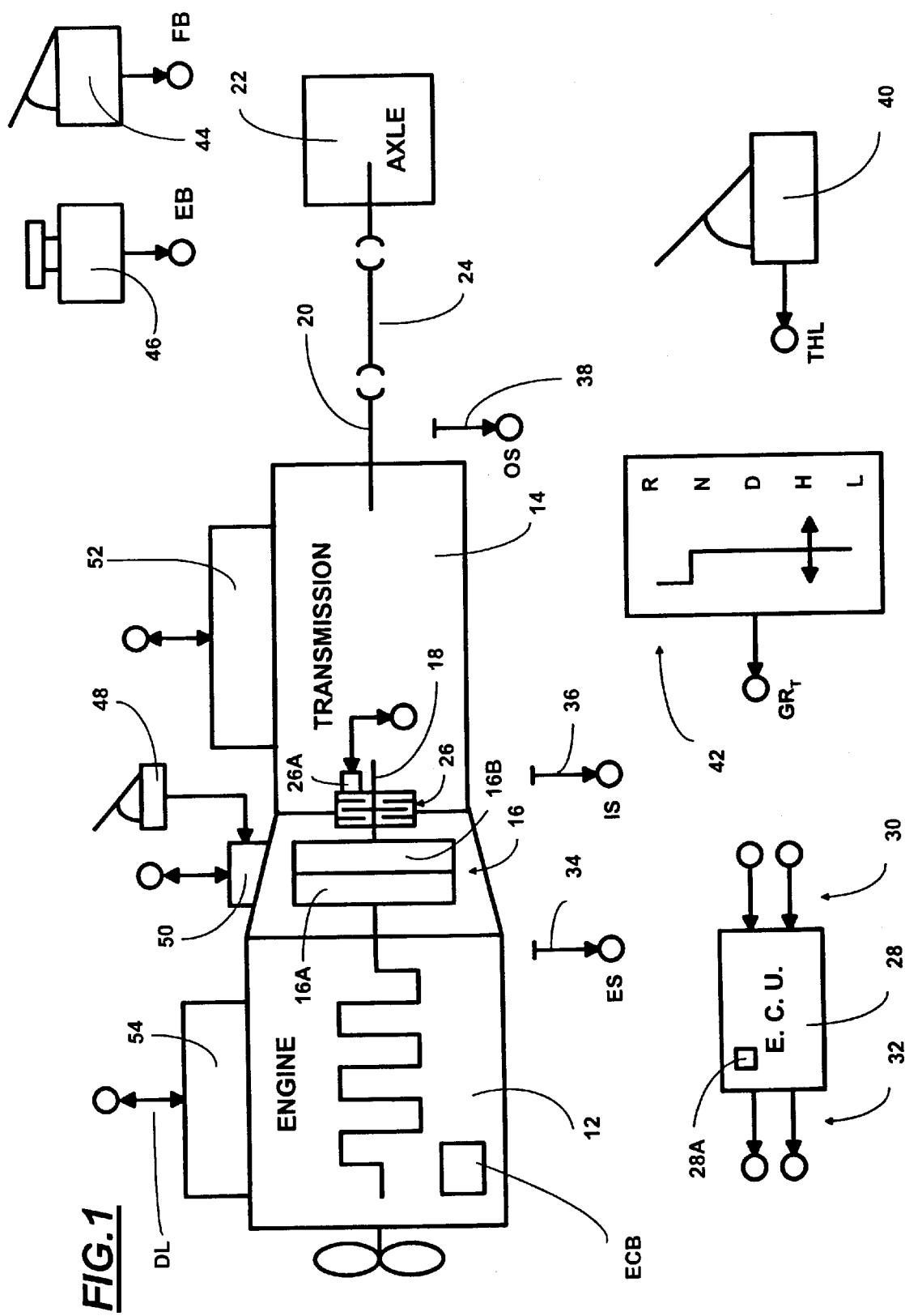
FIG. 1 is a schematic illustration, in block diagram format, of an automated mechanical transmission system utilizing the control of the present invention.

An at least partially automated mechanical transmission system intended for vehicular use is schematically illustrated in FIG. 1. The automated transmission system 10 includes a fuel-controlled engine 12 (such as a well-known diesel engine or the like), a multiple-speed, change-gear transmission 14, and a non-positive coupling 16 (such as a friction master clutch) drivingly interposed between the engine and the input shaft 18 of the transmission. The transmission 14 may be of the compound type comprising a main transmission section connected in series with a splitter- and/or range-type auxiliary section. Transmissions of this type, especially as used with heavy-duty vehicles, typically have 9, 10, 12, 13, 16 or 18 forward speeds. Examples of such transmissions may be seen by reference to U.S. Pat. Nos. 5,390,561 and 5,737,978, the disclosures of which are incorporated herein by reference.

A transmission output shaft 20 extends outwardly from the transmission 14 and is drivingly connected with the vehicle drive axles 22, usually by means of a prop shaft 24. The illustrated master friction clutch 16 includes a driving portion 16A connected to the engine crankshaft/flywheel and a driven portion 16B coupled to the transmission input shaft 18 and adapted to frictionally engage the driving portion 16A. An upshift brake 26 (also known as an input shaft brake or inertia brake) may be used for selectively decelerating the rotational speed of the input shaft 18 for more rapid upshifting, as is well known. Upshift brake 26 may have a single level of retardation or may have two or more selectable levels of retardation. Input shaft or upshift brakes are known in the prior art, as may be seen by reference to U.S. Pat. Nos. 5,655,407 and 5,713,445.

A microprocessor-based electronic control unit (or ECU) 28 is provided for receiving input signals 30 and for processing same in accordance with predetermined logic rules to issue command output signals 32 to various system actuators, such as upshift brake actuator 26A, and the like. ECU 28 may include a clock or other timing device 28A. Microprocessor-based controllers of this type are well known, and an example thereof may be seen by reference to U.S. Pat. No. 4,595,986.

System 10 includes a rotational speed sensor 34 for sensing rotational speed of the engine and providing an output signal (ES) indicative thereof, a rotational speed sensor 36 for sensing the rotational speed of the input shaft 16 and providing an output signal (IS) indicative thereof, and a rotational speed sensor 38 for sensing the rotational speed of the output shaft 20 and providing an output signal (OS) indicative thereof. A sensor 40 may be provided for sensing the displacement of the throttle pedal and providing an output signal (THL) indicative thereof. A shift control console 42 may be provided for allowing the operator to select an operating mode of the transmission system and for providing an output signal ($GR_T$) indicative thereof.

As is known, if the clutch is engaged, the rotational speed of the engine may be determined from the speed of the input shaft and/or the speed of the output shaft and the engaged transmission ratio (ES=IS=OS*GR).

System 10 also may include sensors 44 and 46 for sensing manual operation of the vehicle foot brake (also called service brakes) and/or engine compression brakes (ECB), respectively, and for providing signals FB and EB, respectively, indicative thereof.

The master clutch 16 may be controlled by a clutch pedal 48 or by a clutch actuator 50 responding to output signals from the ECU 28. Alternatively, an actuator responsive to control output signals may be provided, which may be overridden by operation of the manual clutch pedal. In the preferred embodiment, the clutch is manually controlled and used only to launch the vehicle (see U.S. Pat. Nos. 4,850, 236; 5,272,939 and 5,425,689). The transmission 14 may include a transmission actuator 52, which responds to output signals from the ECU 28 and/or which sends input signals to the ECU 28 indicative of the selected position thereof. Shift mechanisms of this type, often of the so-called X-Y shifter type, are known in the prior art, as may be seen by reference to U.S. Pat. Nos. 5,305,240 and 5,219,391. Actuator 52 may shift the main and/or auxiliary section of transmission 14. The engaged and disengaged condition of clutch 16 may be sensed by a position sensor (not shown) or may be determined by comparing the speeds of the engine (ES) and the input shaft (IS).

Fueling of the engine is preferably controlled by an electronic engine controller 54, which accepts command signals from and/or provides input signals to the ECU 28. Preferably, the engine controller 54 will communicate with an industry standard data link DL which conforms to well-known industry protocols such as SAE J1922, SAE 1939 and/or ISO 11898. The ECU 28 may be incorporated within the engine controller 54.

As is known, for automated shifting, the ECU 28 must determine when upshifts and downshifts are required and if a single or skip shift is desirable (see U.S. Pat. Nos. 4,361,060; 4,576,065; 4,916,979 and 4,947,331).

Figure 2:
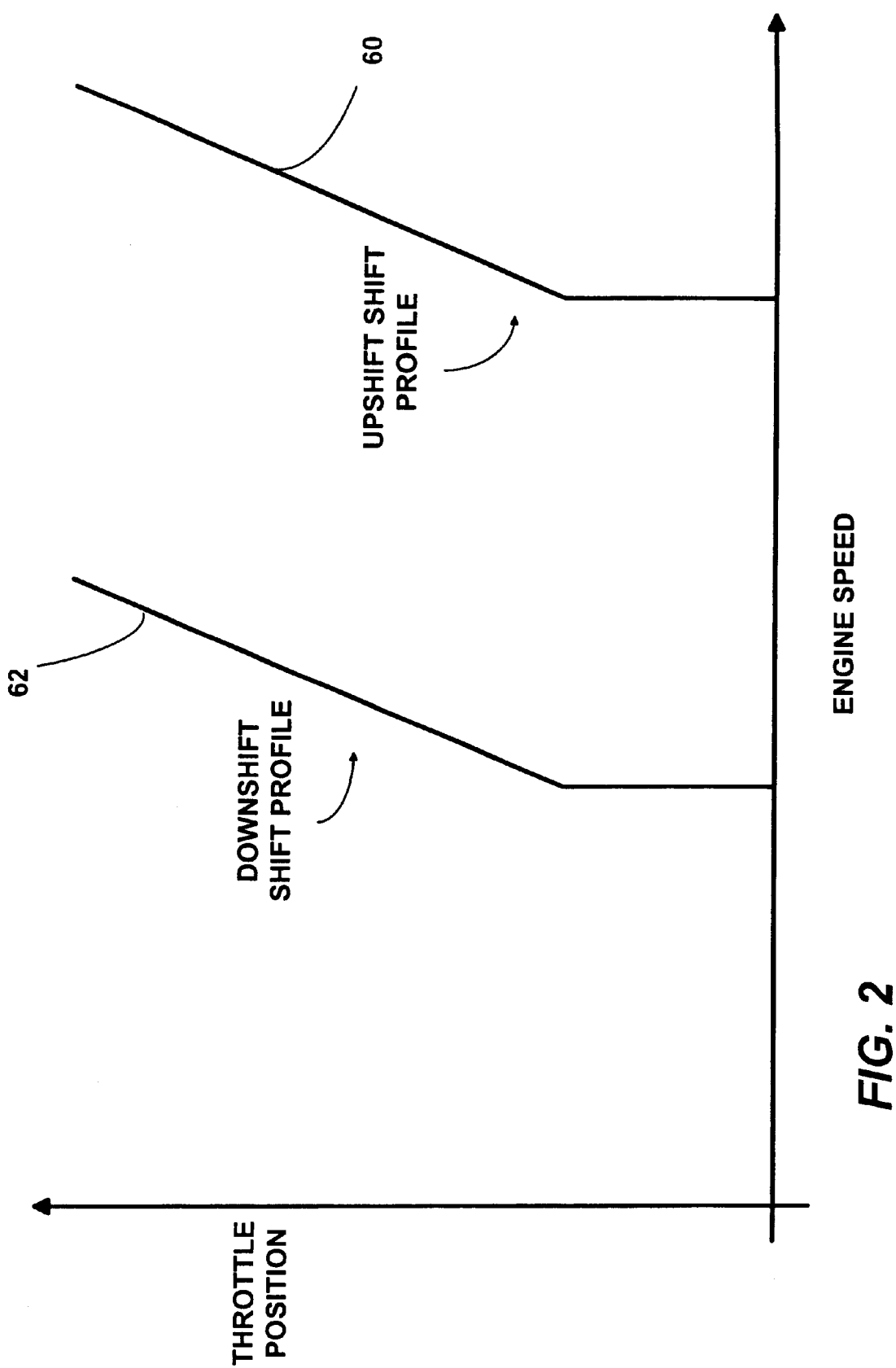
FIG. 2 is a schematic illustration, in graphical format, illustrating shift point profiles for the transmission system of FIG. 1 according to the present invention.

FIG. 2 is a graphical representation of shift point profiles utilized to determine when shift commands should be issued by the ECU 28 to the shift actuator 52. Solid line 60 is the default upshift profile, while solid line 62 is the default downshift profile. As is known, if the vehicle is operating to the right of upshift profile 60, an upshift of transmission 14 should be commanded, while if the vehicle is operating to the left of downshift profile 62, a downshift should be commanded. If the vehicle is operating in between profiles 60 and 62, no shifting of the transmission is then required.

Shift profile 60 is a graphical representation of the engine speeds at which upshifts from a currently engaged ratio (GR) are indicated ($ES_{u/s}$) for various degrees of throttle displacement (i.e., demand).

According to the control of a preferred embodiment of the present invention, if an upshift from a currently engaged ratio (GR) is required (i.e., if at current throttle displacement engine speed (ES) is greater than the upshift engine speed ($ES_{U/S}$) on shift point profile 60), a sequence is initiated for identifying the desirable upshift target ratio ($GR_{TARGET}$), if any. In a preferred embodiment, the control, in sequence, will evaluate unaided and/or aided skip upshifts and then unaided single upshifts and then upshift brake aided single upshifts for desirability and command an upshift to the first potential target ratio deemed desirable.

In a preferred embodiment, a maximum time for completion of an upshift is established based upon considerations for shift quality, vehicle performance, etc. For heavy-duty trucks, by way of example, this time value may have a value of about 1.0 to 2.0 seconds.

A two-part feasibility test is established:

(1) Will the engine speed be at a synchronous value above a preselected minimum engine speed $ES_{MIN}$, given current/assumed engine and vehicle deceleration rates? The $ES_{MIN}$, by way of example, is selected at about 1100 to 1300 rpm, which for a typical heavy-duty diesel engine is at or near a peak torque rpm. The engine deceleration rate may be evaluated with or without the use of engine braking. This logic may be appreciated by reference by U.S. Pat. Nos. 5,335,566 and 5,425,689, the disclosures of which are incorporated herein by reference. Use of engine brakes (also called exhaust and Jake brakes) to enhance upshifting is known, as may be seen by reference to U.S. Pat. No. 5,409,432; and (2) At completion of a proposed upshift, will torque at the drive wheels provide sufficient torque for at least minimal vehicle acceleration? (See U.S. Pat. Nos. 5,272,939 and 5,479,345, the disclosures of which are incorporated herein by reference.

Feasibility also may require that a potential upshift be expected to be completed in a time (T) less than the maximum acceptable time (T<$T_{MAX}$). If one or more of these parts of the feasibility test are not satisfied, the proposed upshift to an evaluated target ratio (GR+1, 2, 3, . . . ) is not feasible and will not be commanded.

According to the logic of a preferred embodiment of the present invention, upon sensing that an upshift is indicated (ES>$ES_{U/S}$), in sequence:

(1) A big skip upshift from the currently engaged ratio GR to GR+3 (without using upshift brakes) is evaluated and if an upshift to GR+3 is feasible, an upshift to GR+3 will be initiated. If not, (2) Then a single skip upshift to GR+2 (without using upshift brakes) is evaluated and if an upshift to GR+2 is feasible, an upshift to GR+2 will be initiated. If not, (3) Then a single upshift to GR+1 (without using upshift brakes) is evaluated and if an upshift to GR+1 (without using engine brakes) is feasible, an upshift to GR+1 (without using engines brakes) will be commanded. If not, (4) Then a single upshift to GR+1 using the upshift brake is evaluated and if an upshift to GR+1 using the engine brake is feasible, an upshift to GR+1 using the upshift brake will be commanded. If not, (5) No upshift will be initiated.

As alternatives, one or more of the skip shifts may be evaluated as upshift brake-aided shifts and/or feasibility of single upshifts may not require completion witin a reference time period ($T_{MAX}$).

Figure 3A:
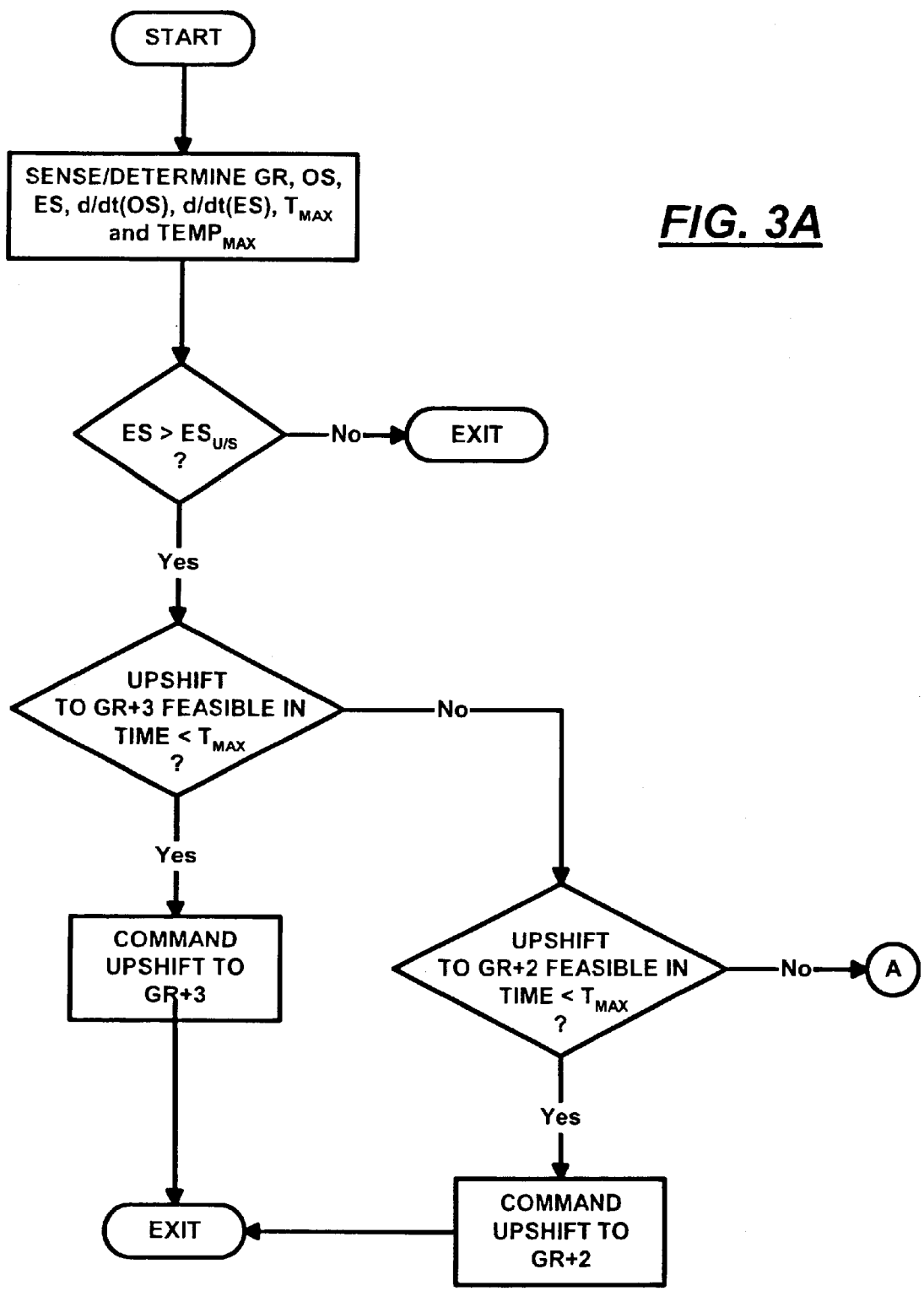
FIGS. 3A and 3B are schematic illustrations, in flow chart format, of the control of the present invention.
Figure 3B:
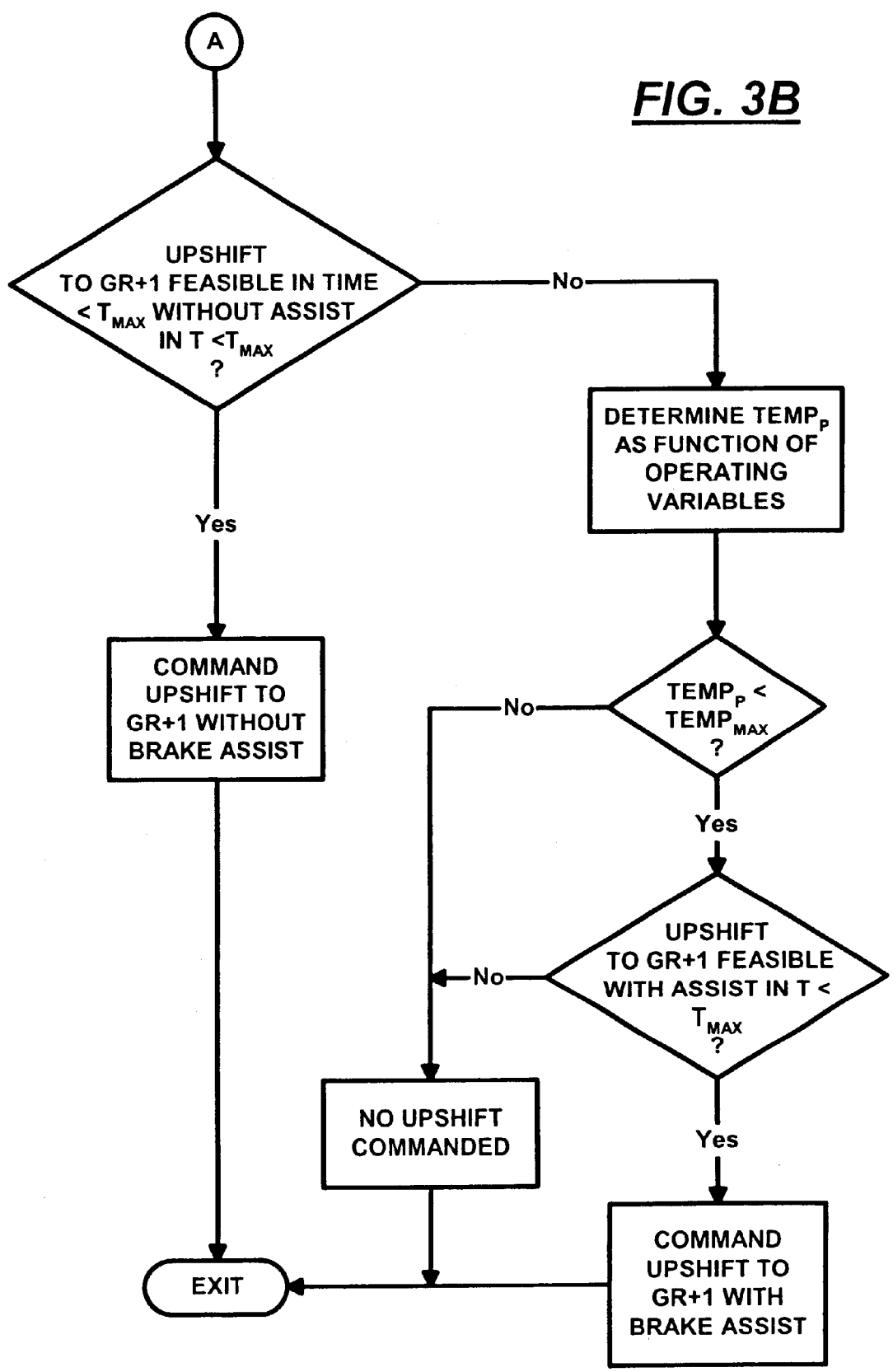

The control of the present invention is shown in flow chart format in FIGS. 3A and 3B. The control logic of the present invention will cause upshifts to the gear ratio, resulting in an engine speed close to, but not less than, a calibrated value, $ES_{MIN}$, which is at or near the peak torque rotational speed of the engine. Although only skip shifts of two ratio steps are illustrated, the present invention also is applicable to skip shifts of three or more ratios.

In one alternative embodiment of the present invention, if evaluated skip upshifts (without using upshift brakes) are found not to be feasible, then the same upshift may be evaluated and commanded using the upshift brakes.

While using the engine brake (usually an engine compression brake) for upshifts is not a first option due to potentially objectionably noisy and/or slower and/or rough shifting, other than for wear, no such drawback is associated with use of the friction upshift brake 26.

In another alternative embodiment of the present invention, when evaluating a single upshift to GR+1 using the upshift brake, the minimum engine speed reference ($ES_{MIN}$) may be lowered to a value 100 to 200 rpm lower than the 1100–1300 rpm value used to evaluate other upshifts. In any event, as such a shift will be a low-quality shift, it is preferable to increase the probability of the shift being determined to be feasible.

According to the present invention, to protect the friction-type upshift brake 26 from thermal damage, the expected or predicted upshift brake temperatures ($TEMP_p$) at completion of a potential brake-aided upshift is determined and compared to a predetermined maximum value ($TEMP_{MAX}$). If the expected upshift brake temperature exceeds the maximum value, upshift brake-aided upshifts are not considered feasible and only unaided shifts are possibly feasible. For one embodiment of upshift brake 26, the maximum temperature is about 350° F.

The predicted temperature, $TEMP_p$, is a calculated or simulated value determined as a function of engine inertia and engine speed information. The preferred relationship is expressed as:

$$TEMP_p = TEMP_i + TEMP_b - TEMP_c$$

where:

$TEMP_p$=predicted brake temperature at completion of an upshift brake-aided upshift;

$TEMP_i$=initial (present) brake temperature;

$TEMP_b$=temperature rise due to brake-aided upshift; and $TEMP_c$=temperature decline during brake-aided upshift.

$TEMP_i$, the simulated initial or present temperature of the brake, is the greater of (i) a minimum value (about 200° F.) or (ii) the last predicted value decreased at a selected cooling rate since the last brake actuation (such as −7° F. per second).

$TEMP_b$, the expected temperature rise due to brake actuation, is a function of one or more of (i) a target engine acceleration ($A_t$), (ii) the natural engine decay rate ($A_e$), (iii) engine inertia (I), often available on the data link, (iv) present engine speed (RPM), (v) step of proposed shift (R) and (vi) a first constant ($K_1$) (in one example, $K_1$=6000 foot-pound-second $\Lambda2$* REV./DEGREE*MINUTES). $TEMP_b$ may be determined from the relationship:

$$((A_t-A_e)/A_t)(\tfrac{1}{2})(RPM)\Lambda2(1-1/R)(1/K_1)$$

$TEMP_c$, the cooling during the assisted shift, is a function of (i) a transmission sump temperature ($TEMP_s$), (ii) an expected shift time (s=(RPM/$A_t$)(1−1/R)), and (iii) a second constant ($K_2$). $TEMP_c$ may be determined from the following relationship:

$$(TEMP_i-TEMP_s+((A_t-A_e)/A_t)(\tfrac{1}{2})(RPM)\Lambda2(1-1/R)(1/K_1))(s)(K_2))$$

As may be seen, the expected temperature of the brake at completion of a proposed shift ($TEMP_p$) may be simulated using various system parameters and may be compared to a maximum reference value ($TEMP_{MAX}$) (such as about 350° F.) to determine if upshift brake assist for a particular upshift is allowable.

The parameters used to simulate the predicted temperature ($TEMP_p$) may include one or more of (i) a simulated initial brake temperature, (ii) time since last brake actuation, (iii) an estimated brake cooling rate when not active, (iv) temperature at completion of last assisted upshift, (vi) a desired engine deceleration rate, (vii) an engine decay rate, (viii) present engine speed, (ix) synchronous engine speed, (x) engine inertia, (xi) ratio step, (xii) calculated shift time, (xiii) cooling rate during brake actuation and/or (xiv) various assumed constants. Of course, less than or more than the above parameters may be used to estimate or simulate an expected brake temperature ($TEMP_p$). A prior art temperature simulation technique may be seen by reference to U.S. Pat. No. 4,576,263, the disclosure of which is incorporated herein by reference.

The inertia or upshift brake 26 may be capable of operation at at least two or more levels of retardation, such as, for example, low, medium and high retardation (see aforementioned U.S. Pat. No. 5,409,432). In such situations, the feasibility of a proposed upshift, and the availability of upshift brake assist for a proposed upshift, may be evaluated separately, in ascending sequence, for each of the available levels of upshift brake effectiveness.

Accordingly, it may be seen that an improved control system/method for controlling upshifting in an at least partially automated mechanical transmission system in a vehicle having an upshift brake system is provided.

Although the present invention has been described with a certain degree of particularity, it is understood that the description of the preferred embodiment is by way of example only and that numerous changes to form and detail are possible without departing from the spirit and scope of the invention as hereinafter claimed.

I claim:

1. A method for controlling automatic upshifting in a vehicular automated mechanical transmission system (10) for a vehicle comprising a fuel-controlled engine (12), a multiple-speed mechanical transmission (14) having an input shaft (18) driven by said engine, a friction upshift brake (26) for selectively retarding rotation of said input shaft, and a controller (28) for receiving input signals (30) including one or more of signals indicative of engine speed (ES), engaged gear ratio (GR) and vehicle speed (OS), and to process said input signals in accordance with logic rules to issue command output signals (32) to transmission system actuators including a transmission actuator (52) effective to shift said transmission and a brake actuator (26A) effective to operate said brake, said logic rules including rules for:
   (a) establishing upshift feasibility criteria whereby upshifts into a target gear ratio are considered feasible only if, under sensed vehicle operating conditions, said criteria is satisfied, and
   (b) determining if upshifts under consideration with use of said brake are feasible,
   said method characterized by the steps of:
      (i) establishing a maximum allowable temperature ($TEMP_{MAX}$) for said brake;
      (ii) determining a predicted brake temperature ($TEMP_p$) at completion of an upshift under consideration using said brake;
      (iii) comparing said maximum allowable temperature to said predicted brake temperature; and
      (iv) if said predicted brake temperature exceeds said maximum allowable brake temperature ($TEMP_p > TEMP_{MAX}$), then not commanding said upshift under consideration using said brake.

2. The method of claim 1 wherein the determination of said predicted brake temperature at completion of an upshift under consideration of step (ii) is determined as a function of system operating parameters including two or more of (a) a simulated current brake temperature ($TEMP_i$); (b) time since last brake actuation (t); (c) inertia of engine (I); (d) unaided deceleration rate of engine ($A_e$); (e) transmission sump temperature ($TEMP_s$); (f) ratio step (R) of upshift under consideration; (g) target deceleration of engine during upshift under consideration using said brake ($A_t$); and (h) time in which upshift under consideration is expected to be completed (s).

3. The method of claim 1 wherein said criteria include at least two of:
   (a) upshifts can be accomplished within a time no greater than a predetermined maximum available time ($T < T_{MAX}$);
   (b) substantial synchronization can be obtained above a predetermined engine speed; and
   (c) at engagement of the target ratio, the vehicle will be capable of at least a predetermined acceleration (dOS/dt).

4. The method of claim 1 wherein said logic rule (b) includes rules for:
   (b1) determining if a single upshift ($GR_{TARGET} = GR+1$) without using said brake is feasible and, if feasible, commanding a single upshift from the currently engaged ratio without using said brake; if not,
   (b2) then determining if a single upshift with use of said brake is feasible and, if so, commanding a single upshift from currently engaged ratio using said brake and, if not,
   (b3) then retaining the transmission engaged in the currently engaged ratio.

5. The method of claim 2 wherein said logic rule (b) includes rules for:
   (b1) determining if a single upshift ($GR_{TARGET} = GR+1$) without using said brake is feasible and, if feasible, commanding a single upshift from the currently engaged ratio without using said brake; if not,
   (b2) then determining if a single upshift with use of said brake is feasible and, if so, commanding a single upshift from currently engaged ratio using said brake and, if not,
   (b3) then retaining the transmission engaged in the currently engaged ratio.

6. The method of claim 3 wherein said logic rule (b) includes rules for:
   (b1) determining if a single upshift ($GR_{TARGET} = GR+1$) without using said brake is feasible and, if feasible, commanding a single upshift from the currently engaged ratio without using said brake; if not,
   (b2) then determining if a single upshift with use of said brake is feasible and, if so, commanding a single upshift from currently engaged ratio using said brake and, if not,
   (b3) then retaining the transmission engaged in the currently engaged ratio.

7. The method of claim 1 wherein said maximum allowable temperature is about 350° F.

8. The method of claim 2 wherein said simulated current brake temperature has a minimum value.

9. The method of claim 8 wherein said minimum value is about 200° F. ($TEMP_i \geq 200°$ F.).

10. The method of claim 2 wherein said transmission sump temperature ($TEMP_s$) is considered to have a constant value.

11. The method of claim 10 wherein said constant value is about 200° F. ($TEMP_s = 200°$ F.).

12. The method of claim 9 wherein said transmission sump temperature ($TEMP_s$) is considered to have a constant value.

13. The method of claim 12 wherein said constant value is about 200° F. ($TEMP_s = 200°$ F.).

14. A control system for controlling automatic upshifting in a vehicular automated mechanical transmission system (10) for a vehicle comprising a fuel-controlled engine (12), a multiple-speed mechanical transmission (14) having an input shaft (18) driven by said engine, a friction upshift brake (26) for selectively retarding rotation of said input shaft, and a controller (28) for receiving input signals (30) including one or more of signals indicative of engine speed (ES), engaged gear ratio (GR) and vehicle speed (OS), and to process said input signals in accordance with with logic rules to issue command output signals (32) to transmission system actuators including a transmission actuator (52) effective to shift said transmission and a brake actuator (26A) effective to operate said brake, said control system including logic rules for:
   (i) establishing a maximum allowable temperature ($TEMP_{MAX}$) for said brake;
   (ii) determining a predicted brake temperature ($TEMP_p$) at completion of an upshift into a particular target gear ratio using said brake;
   (iii) comparing said maximum allowable temperature to said predicted brake temperature; and
   (iv) if said predicted brake temperature exceeds said maximum allowable brake temperature ($TEMP_p > TEMP_{MAX}$), then not commanding said upshift under consideration using said brake.

15. The system of claim 14 wherein the determination of said predicted brake temperature at completion of an upshift under consideration using said brake is determined as a function of system operating parameters including two or more of (a) a simulated current brake temperature ($TEMP_i$); (b) time since last brake actuation (t); (c) inertia of engine (I); (d) unaided deceleration rate of engine ($A_e$); (e) transmission sump temperature ($TEMP_s$); (f) ratio step (R) of upshift under consideration; (g) target deceleration of engine during upshift under consideration using said brake ($A_t$); and (h) time in which upshift under consideration is to be completed (s).

16. The system of claim 14 wherein said logic rules further include rules for:
    (v) commanding upshifts into a target ratio only if:
    ((a)) substantial synchronization can be obtained above a predetermined engine speed; and
    ((b)) at engagement of the target ratio, the vehicle will be capable of at least a predetermined acceleration (dOS/dt).

17. The system of claim 16 wherein said logic rules further include ruels for:
    (vi) estimating a time (T) for completing an upshift into said target ratio; and
    (vii) commanding an upshift into said target ratio only if said estimated time (T) is less than a reference time ($T_{MAX}$).

18. A method for controlling automatic upshifting in a vehicular automated mechanical transmission system (10) for a vehicle comprising a fuel-controlled engine (12), a multiple-speed mechanical transmission (14) having an input shaft (18) driven by said engine, a brake for selectively retarding rotation of said input shaft, and a controller (28) for receiving input signals (30) including one or more of signals indicative of engine speed (ES), engaged gear ratio (GR) and vehicle speed (OS), and to process said input signals in accordance with with logic rules to issue command output signals (32) to transmission system actuators including a transmission actuator (52) effective to shift said transmission and a brake actuator effective to operate said brake, said method including:
    establishing an upshift feasibility criteria;
    if an upshift from a currently engaged ratio (GR) is required, in sequence:
    (a) determining if a single upshift ($GR_{TARGET}$=GR+1) without using said brake is feasible and, if feasible, commanding a single upshift from the currently engaged ratio without using said brake; if not,
    (b) then determining if a single upshift with use of said brake is feasible and, if so, commanding a single upshift from currently engaged ratio using said brake and, if not,
    (c) then retaining the transmission engaged in the currently engaged ratio,
    said method characterized by the steps of:
        (i) establishing a maximum allowable temperature ($TEMP_{MAX}$) for said brake;
        (ii) determining a predicted brake temperature ($TEMP_p$) at completion of an upshift under consideration using said brake;
        (iii) comparing said maximum allowable temperature to said predicted brake temperature; and
        (iv) if said predicted brake temperature exceeds said maximum allowable brake temperature ($TEMP_p$>$TEMP_{MAX}$), then not commanding said upshift under consideration using said brake.

19. The method of claim 18 wherein said criteria include a requirement for determining that, under existing vehicle operating conditions:
    (a) substantial synchronization for engaging a target ratio can be obtained above a predetermined engine speed; and
    (b) at engagement of the target ratio, the vehicle will be capable of at least a predetermined acceleration (dOS/dt).

20. The method of claim 19 wherein said criteria further include a requirement for determining that, under existing vehicle operating conditions, upshifts into a target ratio can be accomplished in a time less than a predetermined maximum time.

* * * * *